(12) United States Patent
Bramhapurkar

(10) Patent No.: US 12,654,997 B2
(45) Date of Patent: Jun. 16, 2026

(54) PNEUMATICALLY OPERATED WEB LIFTING TONGS

(71) Applicant: LM WIND POWER A/S, Kolding (DK)

(72) Inventor: Dinesh Bramhapurkar, Bengaluru (IN)

(73) Assignee: LM WIND POWER A/S, Kolding (DK)

( * ) Notice: Subject to any disclaimer, the term of this patent is extended or adjusted under 35 U.S.C. 154(b) by 119 days.

(21) Appl. No.: 18/283,735

(22) PCT Filed: Apr. 20, 2022

(86) PCT No.: PCT/EP2022/060350
§ 371 (c)(1),
(2) Date: Sep. 22, 2023

(87) PCT Pub. No.: WO2022/223576
PCT Pub. Date: Oct. 27, 2022

(65) Prior Publication Data
US 2024/0181732 A1 Jun. 6, 2024

(30) Foreign Application Priority Data

Apr. 23, 2021 (EP) ..................................... 21170201

(51) Int. Cl.
B66C 1/42 (2006.01)
B66C 1/10 (2006.01)
(Continued)

(52) U.S. Cl.
CPC ............... B66C 1/108 (2013.01); B66C 1/28 (2013.01); B66C 1/427 (2013.01); B66C 1/447 (2013.01);
(Continued)

(58) Field of Classification Search
CPC .. B66C 1/28; B66C 1/30; B66C 1/425; B66C 1/108
See application file for complete search history.

(56) References Cited

U.S. PATENT DOCUMENTS 4,405,168 A * 9/1983 Fritzsche .................. B66C 1/48
294/197
4,703,968 A 11/1987 Labounty
(Continued)

FOREIGN PATENT DOCUMENTS

CN 108946457 A * 12/2018 ............... B66C 1/44
CN 110171767 A * 8/2019 ............. B66C 1/445
(Continued)

OTHER PUBLICATIONS

English translation of CN108946457 (Year: 2018).*
English translation of KR101334338 (Year: 2013).*
English translation of CN110171767 (Year: 2019).*

*Primary Examiner* — Scott W Dodds
(74) *Attorney, Agent, or Firm* — Nath, Goldberg & Meyer; Jerald L. Meyer; Tanya E. Harkins

(57) ABSTRACT

A method of manufacturing a wind turbine blade (10) is provided, the method comprising the steps of providing a first shell half (38) and a second shell half (36), providing at least one shear web (50) having a web body (61) arranged between a first mounting flange (62) and an opposing second mounting flange (63), and providing a lifting assembly (65). The lifting assembly comprising at least one crane device (68), a lifting rail (69) suspended from the at least one crane device (68), and a plurality of lifting clamps (70, 72), each lifting clamp being connected to the lifting rail (69). The method further comprises the steps of attaching the lifting clamps (70, 72) to the shear web (50), lifting the shear web (50) with the lifting assembly (65), lowering the shear web (50) into the first shell half (38) with the lifting assembly (Continued)

Figure 1:
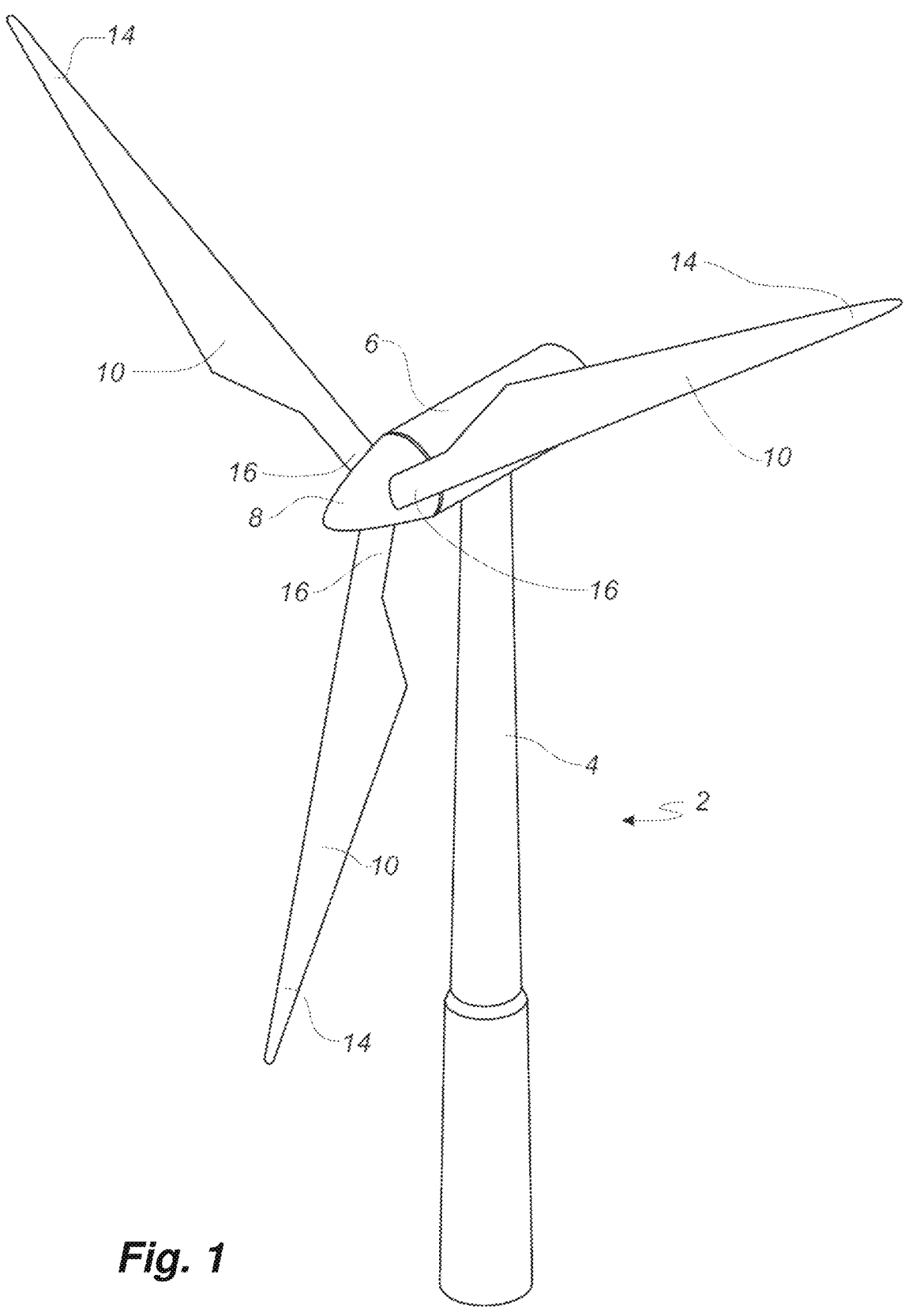

(65), bonding the first mounting flange (62) of the shear web (50) to an inner surface (66) of the first shell half (38), detaching the lifting clamps (70, 72) from the shear web (50), bringing the first and second shell halves (38, 36) together, and bonding the second mounting flange (63) of the shear web to the second shell half (36).

7 Claims, 5 Drawing Sheets

(51) Int. Cl.

| | | |
|---|---|---|
| *B66C 1/28* | (2006.01) |
| *B66C 1/44* | (2006.01) |
| *B66C 1/48* | (2006.01) |
| *F03D 13/10* | (2016.01) |

(52) U.S. Cl.
CPC .............. *B66C 1/48* (2013.01); *F03D 13/104* (2023.08); *F05B 2230/61* (2013.01)

(56) References Cited

U.S. PATENT DOCUMENTS

| | | | |
|---|---|---|---|
| 8,490,519 B2 * | 7/2013 | Lavalley | ............... E21B 19/168 |
| | | | 81/57.35 |
| 8,590,769 B2 * | 11/2013 | LaValley | .................. B26D 3/16 |
| | | | 228/49.3 |

FOREIGN PATENT DOCUMENTS

| | | |
|---|---|---|
| CN | 110451402 B | 10/2021 |
| FR | 2104713 B1 | 4/1972 |
| KR | 10-1334338 B1 | 11/2013 |
| KR | 10-1987809 B1 | 6/2019 |
| WO | 2010/149847 A1 | 12/2010 |

* cited by examiner

PNEUMATICALLY OPERATED WEB LIFTING TONGS

This is a National Phase Application filed under 35 U.S.C. 371 as a national stage of PCT/EP2022/060350, filed Apr. 20, 2022, an application claiming benefit of European Application No. 21170201.4, filed Apr. 23, 2021, the content of each of which is hereby incorporated by reference in its entirety.

FIELD OF THE INVENTION

The present invention relates to a method of manufacturing a wind turbine blade, to a lifting assembly for lifting a shear web for a wind turbine blade, and to a lifting clamp for releasably engaging a shear web for a wind turbine blade.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Wind turbine blades of fibre-reinforced polymer are usually manufactured in moulds, where the pressure side and the suction side of the blade are manufactured separately by arranging glass fibre mats and/or other fibre-reinforcement material, such as carbon fibre, in each of the two mould parts. The two shell halves are usually glued together, wherein an adhesive is applied to the inner face of the lower blade half before the upper blade half is lowered thereon.

Spar caps or main laminates are placed or integrated in the shell halves and may be combined with shear webs or spar beams to form structural support members. Spar caps or main laminates may be joined to, or integrated within, the inside of the suction and pressure halves of the shell. Thus, the shear webs are typically bonded to the inside surface of the lower blade half prior to adhering the upper blade half, usually by means of upper and lower mounting flanges forming opposing edges of the shear web, arranged perpendicular to the web body. An adhesive such as epoxy is applied along these mounting flanges for bonding the shear webs to the respective inner surface of the shell half.

However, challenges involved in this approach include the lifting and correct arrangement of the shear web within the blade half, and the provision of a satisfactory adhesive bonding between the shear web and the shell halves. Engaging existing lifting devices to shear webs can be tedious and often requires operators working under suspended loads. Furthermore, the installation of known tongs or grippers typically require manual intervention for attachment and detachment to the shear web.

In addition, the application of adhesive to the shear web mounting flange can be complicated and tedious, often leading to bond line defects due to lack of access while the shear web is suspended. This is often caused by unintended sway of the shear webs while suspended, potentially leading to glue sticking to frame and damages bond lines. When the shear webs have been placed within a half shell, known clamping devices require manual detachment, requiring operators to climb on an axial guide or a scissor lift to remove the clamps. All of these aspects tend to add to the cycle time and cost of manufacturing wind turbine blades. Also, hazardous or awkward postures of the operators may lead to safety concerns.

It is therefore an object of the present invention to provide an optimized blade manufacturing method which allows for the correct positioning and bonding of shear webs, and which reduces costs and cycle time.

It is another object of the present invention to provide a method of manufacturing a wind turbine blade which allows for an improved process control.

It is another object of the present invention to provide a simplified, safer, and more cost-effective method of manufacturing a wind turbine blade.

It is another object of the present invention to provide an improved lifting device which improves work safety and adhesive bond line quality when lifting and arranging shear webs for wind turbine blades.

SUMMARY OF THE INVENTION

It has been found that one or more of the aforementioned objects can be obtained by a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of providing a first shell half and a second shell half, providing at least one shear web having a web body arranged between a first mounting flange and an opposing second mounting flange, providing a lifting assembly comprising at least one crane device, a lifting rail suspended from the at least one crane device, and a plurality of lifting clamps, each lifting clamp being connected to the lifting rail, attaching the lifting clamps to the shear web, lifting the shear web with the lifting assembly, lowering the shear web into the first shell half with the lifting assembly, bonding the first mounting flange of the shear web to an inner surface of the first shell half, detaching the lifting clamps from the shear web, bringing the first and second shell halves together, and bonding the second mounting flange of the shear web to the second shell half, wherein each lifting clamp comprises a clamp body comprising a fixed support, the clamp body defining a receiving space for receiving at least part of a shear web for a wind turbine blade, such as a mounting flange thereof, a pair of jaws arranged on opposite sides of the receiving space, the pair of jaws being pivotably mounted to the fixed support, and a pair of linear actuators, each actuator being connected to a respective jaw of the pair of jaws for opening and closing the pair of jaws.

It was found that the use of linear actuators for opening and closing the pair of jaws leads to a reduction of operators having to work under suspended load, e.g. during operating and installing the lifting assembly and clamps onto the shear web. Thus, the method of the present invention allows for a remote operation of the lifting assembly without manual intervention of the operator at the lifting clamps. This was found to significantly reduce cycle time during manufacturing.

The first shell half may be a pressure side shell half or a suction side shell half. Similarly, the second shell half may be a pressure side shell half or a suction side shell half. It is preferred that the first shell half is the suction side or downwind shell half, and that the second shell half is the pressure side or upwind shell half.

Each shell half usually comprises a reinforcing structure such as a spar cap or main laminate. The blade shell material may include one or more fibre layers and/or a gelcoat. The shell halves of the blade will typically be produced by infusing a fibre lay-up of fibre material with a resin such as epoxy, polyester or vinyl ester. Usually, the pressure side shell half and the suction side shell half are manufactured using a blade mould. Each of the shell halves may comprise spar caps or main laminates provided along the respective pressure and suction side shell members as reinforcing structures. According to some embodiments, the first shell half and the second shell half each have a longitudinal extent L of 50-100 m, preferably 60-90 m.

At least one shear web is provided having a web body arranged between a first mounting flange and an opposing second mounting flange. Thus, each shear web preferably comprises a web body, a first mounting flange at a first end of the web body, and a second mounting flange at a second end of the web body. In some embodiments, the shear web is substantially I-shaped. Alternatively, the shear webs is substantially C-shaped. In a preferred embodiment, two shear webs are provided, wherein the two shear webs are interconnected with a distance member. In some embodiments, two lifting devices with respective lifting clamps can be used for lifting the two interconnected shear webs.

The first mounting flange of the shear web can be attached to an inner surface of the first shell half. The first mounting flange of the shear web may be attached to a respective shear web mounting region on the inner surface of the first shell half, for example by using an adhesive or a bonding paste. In some embodiments, a guide member, or a pair of guide members, or a plurality of pairs of guide members, are used to guide the first mounting flange of the shear web towards a predefined mounting region on the inner surface of the first shell half. Thus, in some embodiments, guide members may be used on both shell halves.

The lifting assembly comprises at least one crane device. It is preferred that the lifting assembly comprises at least two crane devices. The two crane devices may engage the lifting rail at spaced apart attachments points thereof. Thus a first hook of a crane device may engage the lifting rail at a first connection point, and a second hook of a crane device may engage the lifting rail at a second connection point, wherein the first connection point is closer to a first end of the lifting rail, and the second connection point is closer to an opposed second end of the lifting rail.

It is preferred that the lifting assembly comprises at least two lifting clamps, more preferably at least three lifting clamps, most preferably at least five lifting clamps, each lifting clamp being connected to the lifting rail. In a preferred embodiment, each lifting clamp is connected to the lifting rail by at least one respective chain, cable, or suspension tube, such as a rigid square tube, most preferably by two chains, cables or suspension tubes, such as rigid square tubes per lifting clamp, wherein suspension tubes, such as rigid square tubes are most preferred. Using suspension tubes, such as rigid square tubes, helps to minimize the sway of tongs during movement of the lifting rail. In some embodiment, prior to the step of attaching the lifting clamps to the shear web, the lifting rail may be placed adjacent to the location of the shear web(s), such as adjacent to a shear web wagon. Subsequently, the lifting rail can be lifted and placed onto a parking stand on the web wagon.

It is preferred that the step of attaching the lifting clamps to the shear web is accompanied by, or followed by, a step of applying an adhesive or bonding paste to the mounting flange, preferably at least to the mounting flange enclosed by the lifting clamps, which is preferably the second mounting flange, while the lifting clamps are attached to the shear web. Thus, in a preferred embodiment, an adhesive or bonding paste is applied to the second mounting flange, which is received in the receiving space of the lifting clamp, after the step of attaching the lifting clamps to the web body of the shear web and before the step of lifting the shear web with the lifting assembly. Preferably, the method also comprises a step of applying adhesive or bonding paste to a predefined area on the inner surface of the first shell half, such as on a spar cap or main laminate.

The shear web can be lifted, e.g. from a web wagon, with the crane using the lifting assembly, and can be moved to a predetermined destination, such as a blade mould containing the first shell half. Then, the shear web is lowered into the first shell half using the lifting assembly. The first mounting flange of the shear web can be bonded to an inner surface of the first shell half, such as a spar cap region. Prior to bonding, adhesive or bonding paste can be applied to the first mounting flange and/or to the inner surface of the first shell half.

The step of detaching the lifting clamps from the shear web is typically carried out once the shear webs are completely supported within the shell half. The step of detaching the lifting clamps from the shear web can advantageously be carried out by using the linear actuators, preferably pneumatic cylinders, most preferably pneumatic double-acting cylinders, for releasing the shear web from the jaws. The opening and closing of the jaws is preferably achieved by causing motion of the linear actuators using respective directional control valves. In some embodiments, the step of detaching the lifting clamps involves (re-)connecting the lifting clamps to a pneumatic power supply and using an activator switch or button to open all lifting clamps simultaneously. Subsequently, the lifting rail can be lifted and removed.

The first and second shell halves are brought together, usually by closing a blade mould comprising the first shell half and the second shell half, preferably while guiding the second mounting flange of the shear web using a guide member towards a shear web mounting region in the second shell half.

Bonding the second mounting flange of the shear web to the second shell half is typically done by applying an adhesive or bonding paste to the second mounting flange, and/or to the inner surface of the shell half at the shear web mounting region. Also, the shell halves are usually bonded to each other in this step along respective leading edge and trailing edge flanges, usually using an adhesive.

Each lifting clamp comprises a clamp body comprising a fixed support. It is preferred that the fixed support comprises at least one base plate. In a preferred embodiment, the lifting clamp comprises two base plates which are arranged as spaced side plates defining a cavity in between the side plates, wherein the cavity is arranged to accommodate the pair of clamps in their retracted position. The jaws are preferably pivotably mounted to the base plate or to the two base plates acting as spaced side plates.

The clamp body defines a receiving space for receiving at least part of a shear web for a wind turbine blade. Preferably, the receiving space is arranged to receive the entire chordwise extent of the mounting flange of the shear web, such as of the second mounting flange of the shear web, within the receiving space. It is preferred that the receiving space is defined by respective U-shaped, rectangular or trapezoid (or combinations thereof) slots of opposed side plates of the clamp body. It is particularly preferred that the receiving space is large enough to accommodate the second mounting flange of the shear web such that sufficient clearance is provided in the receiving space above the second mounting flange to allow for the application of adhesive to the second mounting flange during engagement of the lifting clamp to the shear web. Thus, the receiving space preferably has a vertical extent (height) of at least 250 mm, and a horizontal extent (width) of at least 150 mm, preferably at least 200 mm. Preferably, the receiving space has a variable width, with a minimum width of at least 150 mm, preferably at least 200 mm, throughout its vertical extent.

In a particularly preferred embodiment, each base plate (side plate) comprises a cut-out which has a lower part which is trapezoid-shaped and an adjacent upper part which is rectangle-shaped. The trapezoid-shaped lower part preferably defines an opening or a funnel of the receiving space, wherein the width of the opening or funnel increases in a downward direction. Thus, the lifting clamp is typically downwardly open when suspended from the lifting rail. The term "downward" refers to the direction that faces or is directed toward the ground surface when the lifting clamp is suspended, for example from the lifting rail or from a crane device.

A respective jaw is arranged on both opposite sides of the receiving space, preferably such that the jaws extend into the receiving space in their engagement position. In a preferred embodiment, the jaws stay clear from the receiving space in their retracted position in that they are received in between the two side plates of the lifting clamp.

The pair of jaws are pivotably mounted to the fixed support, preferably by respective shafts, preferably by a shaft mounted to a base plate, preferably between two base plates acting as side plates. The linear actuators may be connected to their respective jaw, preferably to a proximal end of the respective jaw, by a suitable shaft or pin, such that the actuators cause movement of the jaws from a retracted position to an engagement position, or vice versa. Thus, preferably each linear actuator is connected to the fixed support at a first end of the actuator and to a respective jaw at an opposing second end of the actuator.

Typically, the step of attaching the lifting clamps to the shear web comprises closing the pair of jaws with the pair of linear actuators. Thus, the jaws are movable between a retracted position and an engagement position.

In a preferred embodiment, the step of detaching the lifting clamps from the shear web comprises opening the pair of jaws with the pair of linear actuators. In a preferred embodiment, each linear actuator is a pneumatic cylinder. In other embodiments, the linear actuator may be a hydraulic cylinder.

In a preferred embodiment, the step of attaching the lifting clamps to the shear web comprises attaching the lifting clamps to the web body of the shear web such that the second mounting flange of the shear web is received within the respective receiving space of each lifting clamp. Thus, in this embodiment, the first mounting flange is not engaged by the lifting device. During the lifting operation, the first mounting flange will typically face downward, while the second mounting flange will typically face upward. In a particularly preferred embodiment, the jaws of the lifting clamp have no contact with the mounting flanges of the shear web when engaging the shear web. This is found to be particularly advantageous if adhesive is to be applied while the shear web is engaged by the lifting clamps.

Thus, in a preferred embodiment, an adhesive is applied to the second mounting flange of the shear web while the mounting flange is received within the respective receiving space of each lifting clamp. A plurality of lifting clamps may be arranged at spaced locations along the spanwise extent of the shear web, wherein at each location the mounting flange is receive in the receiving space of the respective lifting clamp. When the shear web is engaged by the jaws, the mounting flange received in the receiving space of the lifting clamp is preferably not touched by any part of the lifting clamp.

In another aspect, the present invention relates to a lifting clamp for releasably engaging a shear web for a wind turbine blade, the lifting clamp comprising a clamp body comprising a fixed support, the clamp body defining a receiving space for receiving at least part of a shear web for a wind turbine blade, a pair of jaws arranged on opposite sides of the receiving space, the pair of jaws being pivotably mounted to the fixed support, a pair of linear actuators, each actuator being connected to a respective jaw of the pair of jaws for opening and closing the pair of jaws.

In a preferred embodiment, each linear actuator of the lifting clamp is a pneumatic cylinder. In a preferred embodiment, the linear actuators are arranged within the clamp body, such that the linear actuators do not protrude into the receiving space. Preferably, the linear actuators are mounted in between the two side plates of the lifting clamp.

It is preferred that the lifting clamp comprises a geared arrangement for providing synchronized movement of the jaws. In a preferred embodiment, the lifting clamp further comprises a pair of arms, each arm having a first end and an opposing second end, and a pair of sector gears, wherein each arm is connected to one jaw of the pair of jaws at the first end and to a respective sector gear at its second end, and wherein the pair of sector gears is engaged together to provide a synchronized movement of the pair of jaws. This provides a particularly advantageous way of providing synchronized movement of the jaws from a retracted position to an engagement position in which the shear web body is engaged.

In a preferred embodiment, the lifting clamp further comprises a pair of guide members, each guide member comprising a slot, wherein each guide member is connected to one jaw of the pair of jaws, and wherein the lifting clamp further comprises a pair of pins rigidly mounted to the clamp body, wherein one pin of the pair of pins is received within the slot of each guide member for restricting the movement of the guide member and the connected jaw relative to the clamp body. Thus, the guide members provide a safety measure preventing movement of the jaws beyond a predefined position.

In a preferred embodiment, the clamp comprises at least two spaced attachment eyes each adapted for receiving a hook or a chain therein. In a preferred embodiment, the linear distance between the two space attachment eyes is at least 100 mm, preferably at least 200 mm, such as at least 300 mm. This advantageously enables a suspension of the lifting clamp from two separate chains or cables connecting the clamp to the lifting rail. By using at least two cables or chains per clamp, a more stable positioning of the clamp is achieved with minimized undesired movement of the shear web during the lifting/lowering operations.

In some embodiments, the lifting clamp comprises one or more handles mounted to the fixed support, such as to one or more base plates. This enables operators to pull the lifting clamp and arrange it at the desired position.

The lifting clamp preferably comprises two or more directional control valves operably connected to the linear actuators, such as the pneumatic cylinders, for enabling opening and closing of the jaws. Preferably, at least one directional control valve is operably connected to the linear actuators.

In a preferred embodiment, the lifting clamp comprises a valve assembly operably connected to the linear actuators for delivering a supply flow of pneumatic air from a supply of pressurized air to the linear actuators. The lifting clamp also typically comprises one or more air tubes connecting the actuators to the valve assembly and/or connecting the valve assembly to a supply or pressurized air. In other embodiment, the lifting assembly of the present invention comprises a valve assembly which is located remotely from the lifting clamp, for example located on a ground surface below the suspended lifting clamp, wherein said valve assembly is operably connected to the linear actuators for delivering a supply flow of pneumatic air from a supply of pressurized air to the linear actuators.

In a preferred embodiment, the lifting clamp comprises two or more actuator buttons operatively connected to the valve assembly for actuating the delivery of pneumatic air to or from the linear actuators, respectively. Said actuator buttons may be connected to, or may be part of, a set of directional control valves operably connected to the linear actuators.

In a preferred embodiment, each jaw of the pair of jaws has a free end, wherein the free end is equipped with a pad or a lining, such as a rubber pad or rubber lining. This is found to provide a particularly advantageous embodiment for engaging the web body in a safe and reliable manner. The free end of the jaw is also termed the distal end thereof, whereas the opposing end of the jaw is termed the proximal end herein.

In a preferred embodiment, the clamp body comprises spaced side plates, for example constituted by respective base plates, each side plate/base plate comprising a slot or cut-out for defining the receiving space. Preferably, the slot is rectangular or U-shaped.

In a particularly preferred embodiment, the slot or cut-out comprises at least one rectangular section and at least one trapezoid or funnel-shaped section. In some embodiment, the clamp may comprise a locking mechanism to lock the jaws in respective open or closed positions.

In a preferred embodiment, the receiving space is substantially rectangular or U-shaped, or comprises a substantially rectangular or trapezoid-shaped portion. In a preferred embodiment, the receiving space has a width of at least 150 mm, preferably at least 200 mm. This width advantageously enables the receiving space to receive the mounting flange of the shear web along its entire chordwise extent, at any given spanwise position of the shear web. It was found that the arrangement with the receiving space of the lifting clamp provides increased clearance for the application of adhesive to the mounting flange of the shear web, for example by a glue shoe. It is particularly preferred that the lifting clamp stays clear of the mounting flange received therein. Thus, the lifting clamp of the present invention enables that adhesive can be applied to the shear web, while the shear web is engaged by the lifting assembly. This overcomes some of the above-described problems with the application of adhesive during movement of known lifting assemblies, in particular adhesive sticking to the lifting assembly or clamps resulting in reducing the function of the glue set, which is seen with prior art solutions. This helps to avoid bond line defects when adhesive is being applied to the mounting flange during lifting.

While preferably the entire chordwise extent of the mounting flange of the shear web is received in the receiving space of the lifting clamps, a plurality of spaced lifting clamps is arranged along the spanwise extent of the shear web and its mounting flange. Typically the spanwise distance between neighbouring lifting clamps fixed to the shear web can be several meters, such as at least 2 meters, or at least 3 meters.

In another aspect, the present invention relates to a lifting assembly for lifting a shear web for a wind turbine blade, the lifting assembly comprising at least one crane device, a lifting rail suspended from the at least one crane device, a plurality of lifting clamps according to the present invention, each lifting clamp being connected to the lifting rail.

In a preferred embodiment, each lifting clamp is suspended from the lifting rail by a pair of chains or cables fixed to the lifting clamp at respective spaced apart attachment points. This was found to result in improved suspension of the lifting clamp, thus preventing the lifting clamps from swaying during movement of the lifting assembly. In a preferred embodiment, the pair of chains or cables or suspension tubes is provided between the lifting rail and the respective lifting clamp in a substantially triangular, or upside-down V-shaped arrangement, or in a funnel-shaped arrangement, in which the two chains or cables have a decreasing mutual distance seen in the downward direction.

In another embodiment, each lifting clamp is rigidly connected to the lifting rail with suspension arms installed on the lifting rail.

In a preferred embodiment, one or more air supply hoses are arranged along the lifting rail for supply air to the respective pneumatic cylinders of the lifting clamps. In a preferred embodiment, the lifting assembly comprises a reel member rotatably mounted on the lifting rail for receiving at least part of the air supply hose(s). The reel member is advantageously rotatably mounted on the lifting rail at one end of the lifting rail. Thus, an operator can pull a free end of the air supply hose(s) towards the ground for connecting the free end to a suitable air supply, such as an air compressor or to a control stand connected to an air supply. An operator standing on the ground can then switch on the air supply and click on an activate button on the control stand.

Thus, in a preferred embodiment, the lifting assembly further comprises an air compressor connected to an air supply line, wherein the free end of the air supply hose is releasably connected to the air compressor. In a particularly preferred embodiment, the air compressor is placed on the ground, such as the ground of a factory floor, wherein the air supply hose leads up to the lifting rail and the respective lifting clamps. Thus, the opening and closing of the jaws of the lifting clamp is advantageously controlled from the ground level, for example by using one or more actuator buttons on the air compressor.

In a particularly preferred embodiment, the air compressor is spaced apart from the lifting rail and the lifting clamps, such as located at ground level below the suspended lifting clamps.

In another aspect, the present invention relates to a wind turbine blade obtainable by the method of the present invention.

All features and embodiments discussed above with respect to the method of manufacturing a wind turbine blade likewise apply to the lifting assembly and to the lifting clamp of the present invention, and vice versa.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

Figures 2, 3:
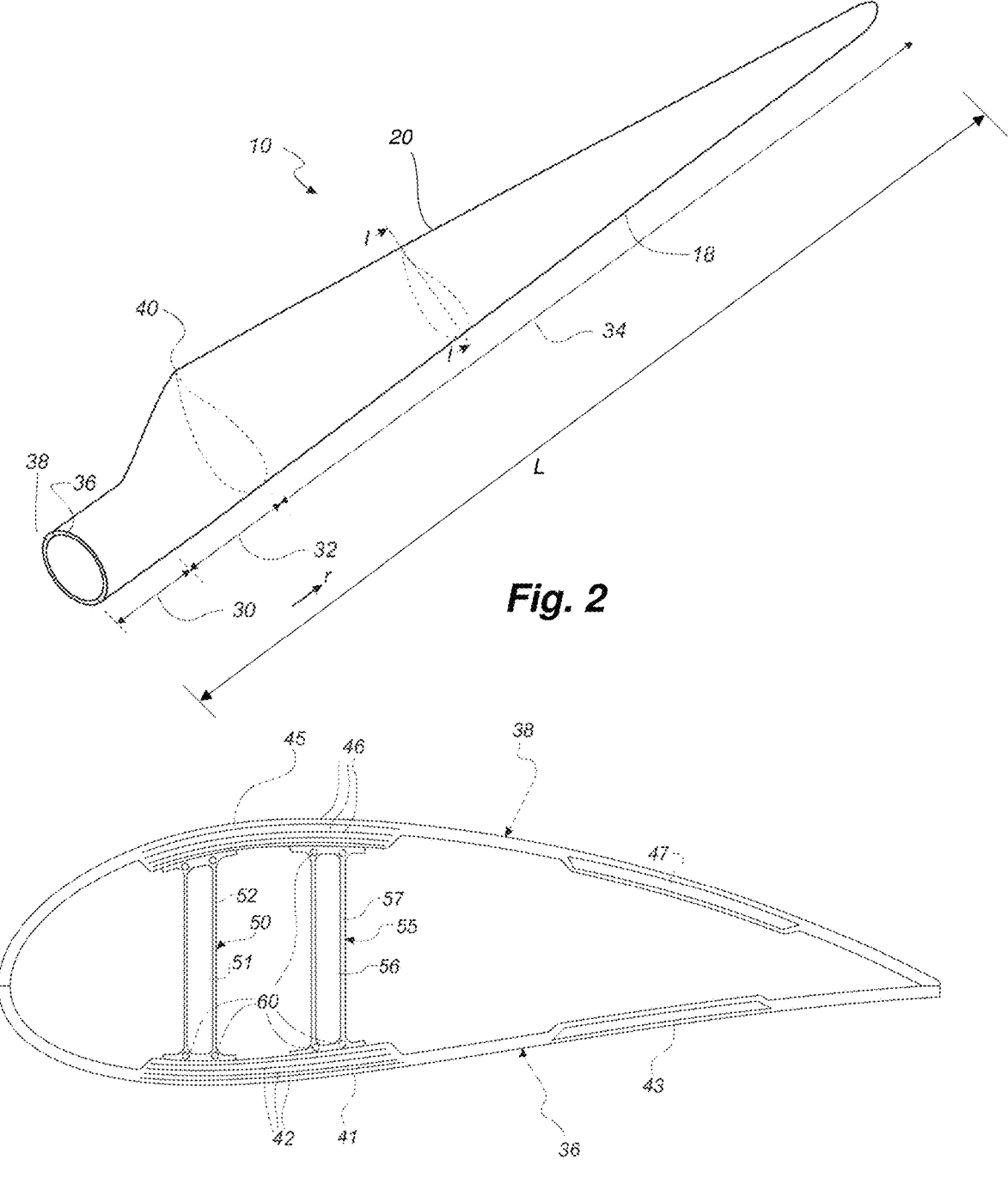
Figure 4:
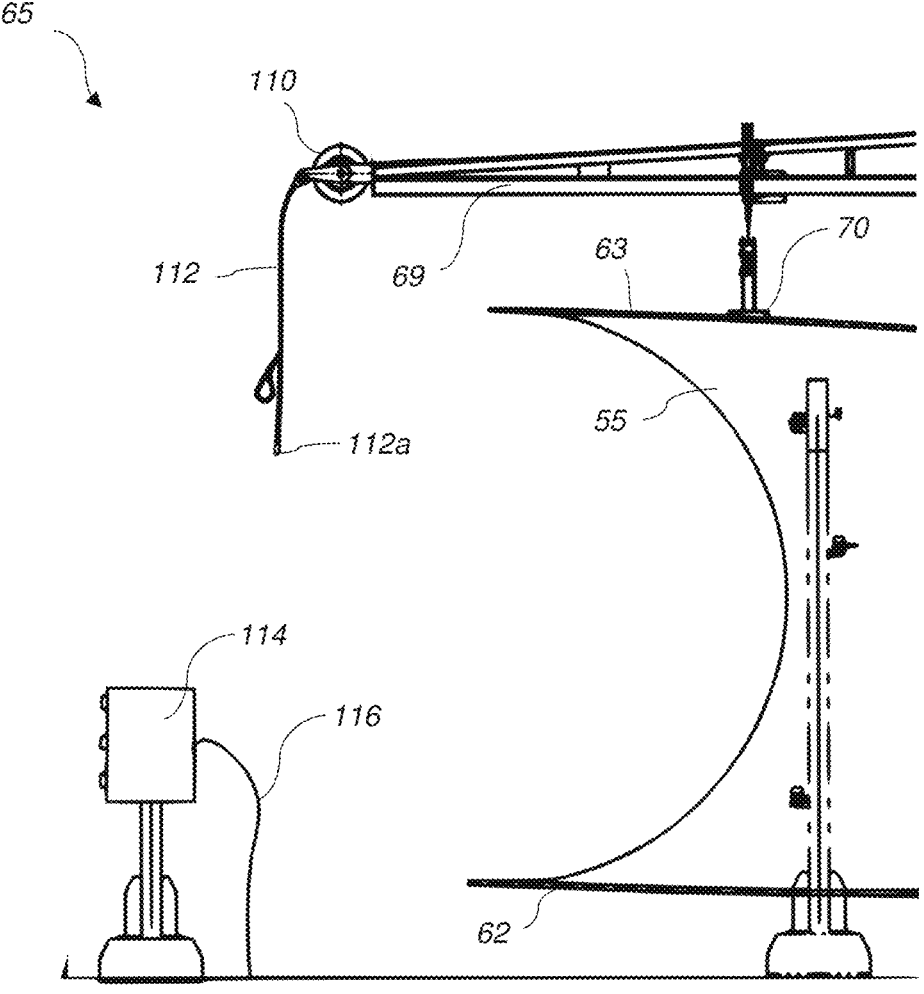
Figure 5:
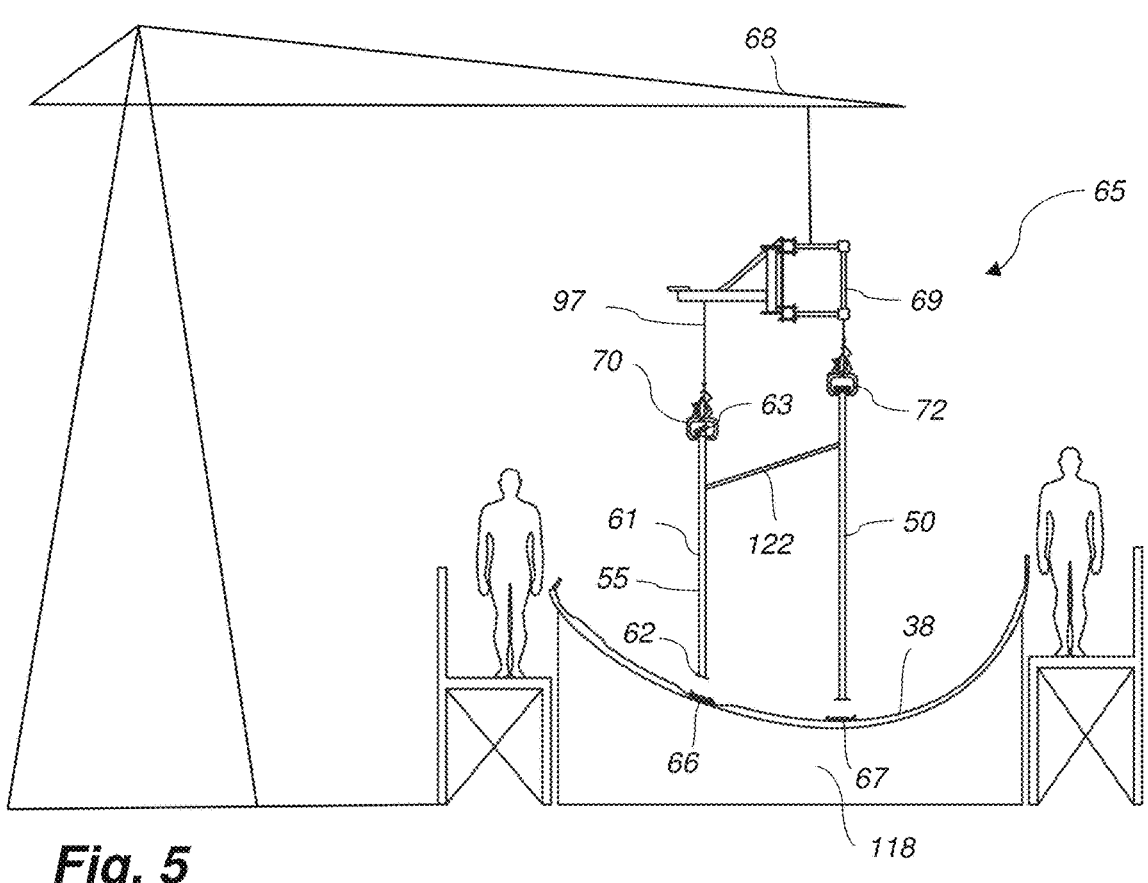
Figure 6:
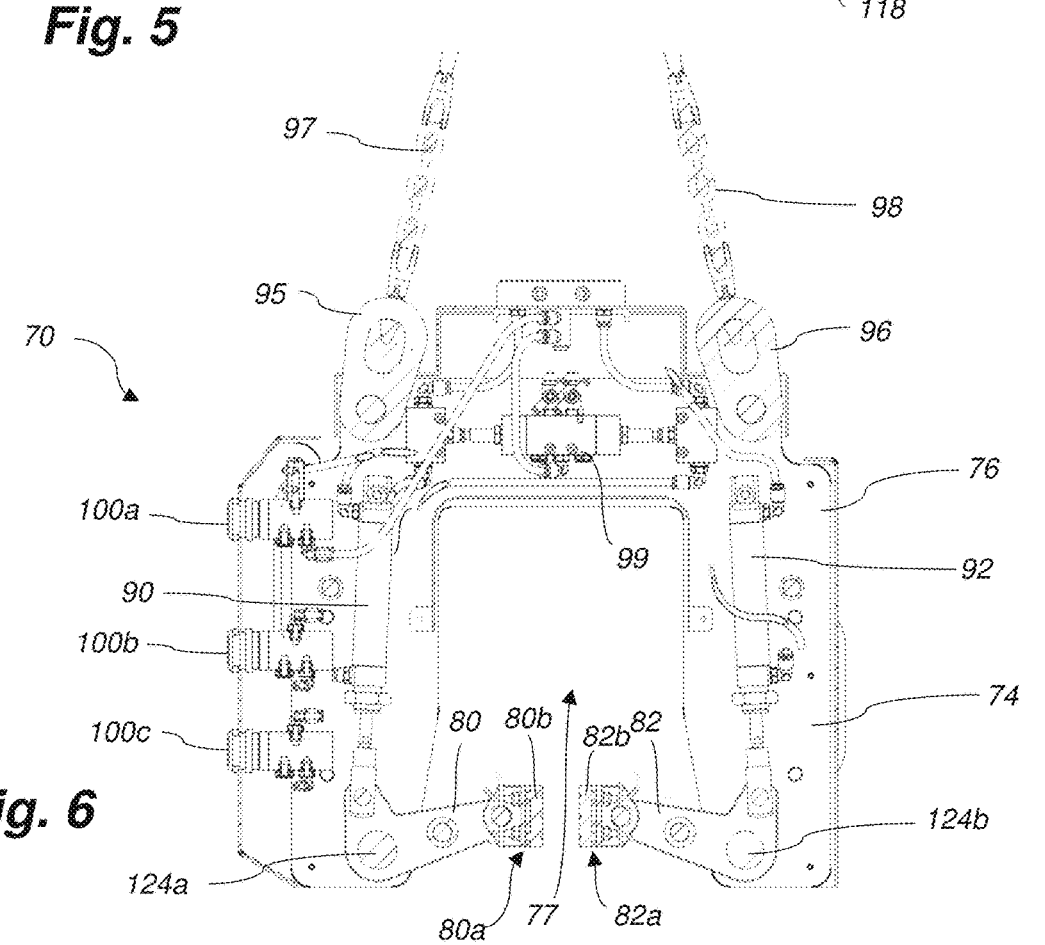
Figures 7, 8, 9, 10:
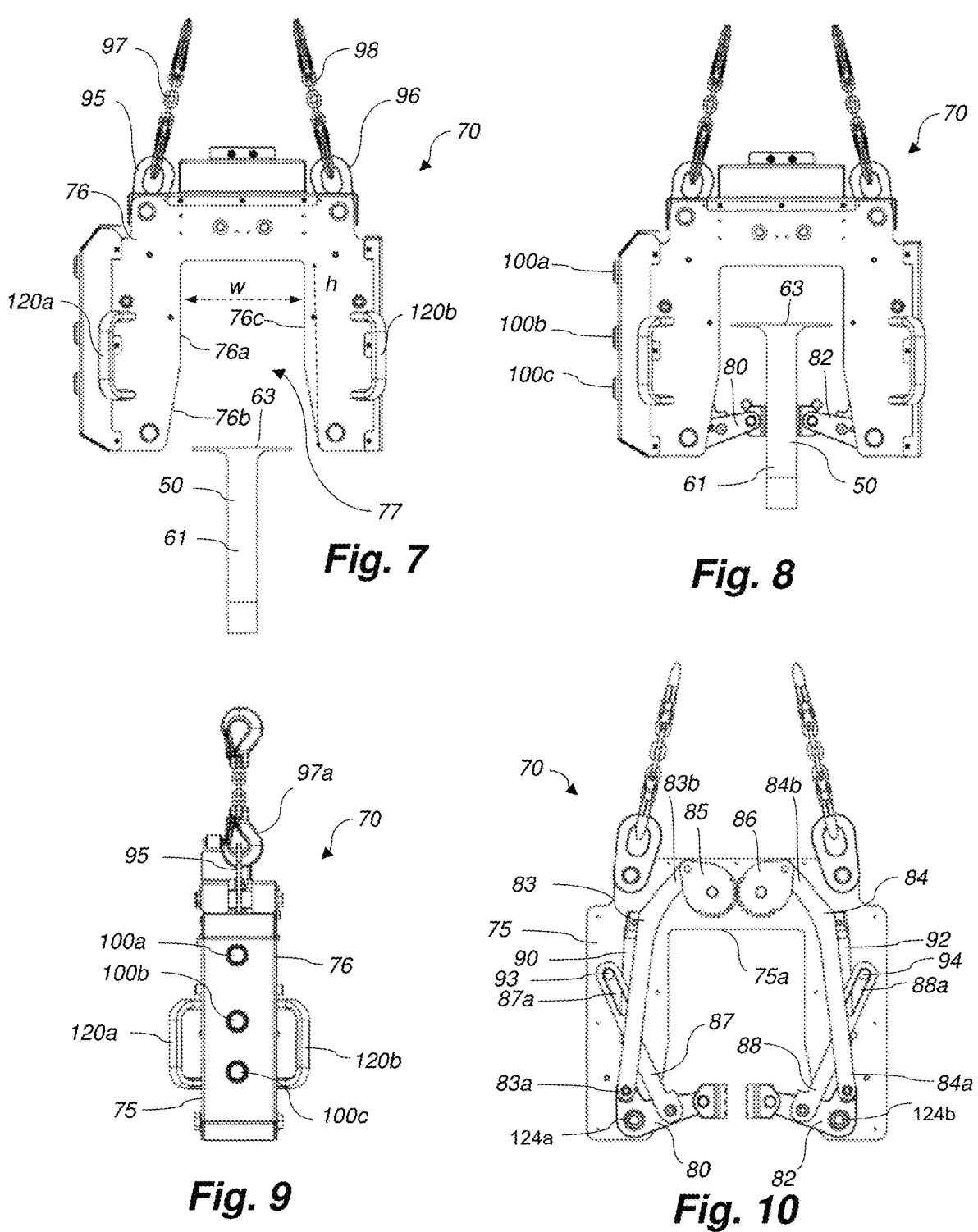

The invention is explained in detail below with reference to embodiments shown in the drawings, in which FIG. 1 shows a wind turbine, FIG. 2 shows a schematic view of a wind turbine blade, FIG. 3 shows a schematic view of a cross-section of a wind turbine blade, FIG. 4 is a schematic partial view of a lifting assembly according to the present invention, FIG. 5 is a schematic view of a lifting assembly according to the present invention, FIG. 6 is a cross sectional view of a lifting clamp according to the present invention, FIGS. 7 and 8 are front views of a lifting clamp according to the present invention, FIG. 9 is a side view of a lifting clamp according to the present invention, and FIG. 10 is front view of a lifting clamp according to the present invention wherein the side cover is removed.

DETAILED DESCRIPTION OF THE FIGURES

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47. The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

FIGS. 4 and 5 illustrate various steps of a method of manufacturing a wind turbine blade according to the present invention. A lifting assembly which can be used in such method is generally indicated at 65. The assembly comprises at least one crane device 68, such as two crane devices, and a lifting rail 69 which is suspended from the crane device 68. The lifting rail 69 can be suspended by one or more cables. A plurality of lifting clamps 70, 72 is provided, each lifting clamp being connected to the lifting rail 69, e.g. by chain 97.

Also, an air supply hose 112 is arranged along the lifting rail 69 for supply air to the respective pneumatic cylinders of the lifting clamps 70, 72. The lifting assembly 65 also comprises a reel member 110 rotatably mounted on the lifting rail 69 for receiving at least part of the air supply hose 112. A ground-based air compressor 114 which is connected to an air supply line 116 is provided, wherein the free end 112a of the air supply hose is releasably connected to the air compressor 114.

A first shell half 38, such as a downwind shell half is provided, e.g. in mould and a second shell half 36, for receiving one or more shear webs 50, 55, each having a web body 61 arranged between a first mounting flange 62 and an opposing second mounting flange 63. As shown in FIG. 5, two shear webs 50, 55 may be interconnected by connecting element 122 during placement of the shear webs. The lifting clamps 70, 72 are attached to the shear webs 50, 55 for lifting and lowering the same into the first shell half 38. The first mounting flange 62 of the shear web 50 is bonded to an inner surface of the first shell half 38, such as spar caps 66, 67.

The lifting clamps 70, 72 can then be detached from the shear web 50, followed by bringing the first and second shell halves 38, 36 together. The second mounting flange 63 of the shear web can then be bonded to the second shell half 36 to produce a closed wind turbine blade of the kind illustrated in FIG. 3.

Further details of the lifting clamp are illustrated in FIGS. 6-10. Each lifting clamp 70, 72 comprises a clamp body 74 with a fixed support, preferably provided by base plates 75, 76. The spaced base plates 75, 76, each comprise a slot or cut-out 75a, 76a for defining the receiving space 77, see FIGS. 7-10. The front base plate 76 is removed in FIG. 10 to illustrate some of the inside parts of the clamp. Each base plate 75, 76 has a cut-out 76a which has a lower part 76b which is trapezoid-shaped and an adjacent upper part 76c which is rectangle-shaped, as seen in the front view of FIG. 7.

The clamp body 74 defines a receiving space 77 for receiving at least part of a shear web for a wind turbine blade. The height h and the width w of the receiving space 77 are illustrated in FIG. 7. A pair of jaws 80, 82 are arranged on opposite sides of the receiving space 77, the pair of jaws 80, 82 being pivotably mounted to the fixed support 75, 76, by shafts 124a, 124b. A pair of pneumatic cylinders 90, 92 is provided for opening and closing the pair of jaws 80, 82. Each jaw of the pair of jaws 80, 82 has a free end 80a, 82a, wherein the free end is equipped with a pad or a lining 80b, 82b, such as a rubber pad or rubber lining.

For attaching the lifting clamps 70, 72 to the shear web 50 the pair of jaws 80, 82 is closed with the pair of linear actuators 90, 92. The lifting clamps 70, 72 are attached to the web body 61 of the shear web such that the second mounting flange 63 of the shear web 50 is received within the respective receiving space 77 of each lifting clamp. This advantageously provides sufficient clearance for adhesive application to the mounting flange 63; see FIG. 8. Thus, an adhesive can be applied to the second mounting flange 63 of the shear web 50 while the second mounting flange 63 is received within the respective receiving space 77 of each lifting clamp.

Similarly, the step of detaching the lifting clamps 70, 72 from the shear web 50 comprises opening the pair of jaws 80, 82 with the pair of linear actuators 90, 92.

As seen in FIG. 7, the linear actuators 90, 92 are fully arranged within the clamp body 74 in their retracted position. The lifting clamp 70 may further comprise a pair of arms 83, 84, each arm having a first end 83a, 84a and an opposing second end 83b, 84b, and a pair of sector gears 85, 86; see FIG. 10. Each arm 83, 84 is connected to one jaw of the pair of jaws 80, 82 at the first end 83a, 84a and to a respective sector gear 85, 86 at its second end 83b, 84b, and wherein the pair of sector gears 85, 86 is engaged together to provide a synchronized movement of the pair of jaws 80, 82.

As also shown in FIG. 10, the lifting clamp 70 may also comprise a pair of guide members 87, 88, each guide member comprising a slot 87a, 88a, wherein each guide member 87, 88 is connected to one jaw of the pair of jaws 80, 82, and wherein the lifting clamp 70 further comprises a pair of pins 93, 94 rigidly mounted to the clamp body 74, wherein one pin of the pair of pins 93, 94 is received within the slot of each guide member for restricting the movement of the guide member and the connected jaw relative to the clamp body. Thus the guide members can be provided for enhanced safety of the lifting clamp, preventing jaw movement beyond a predefined point.

As shown in FIGS. 6-10, the clamp 70 comprises at least two spaced attachment eyes 95, 96 each adapted for receiving a hook or a chain 97, 98 therein. Thus, each lifting clamp 70, 72 can be suspended from the lifting rail 69 by a pair of chains or cables 97, 98 fixed to the lifting clamp at the respective spaced apart attachment points 95, 96. The pair of chains or cables can be provided between the lifting rail 69 and the respective lifting clamp in a substantially upside down V-shaped arrangement, as seen in FIG. 6. The clamp 70 may also comprise one or more handles 120a, 120b, which allow operators to grasp and pull the clamp.

The lifting clamp 70 preferably comprises a valve assembly 99 connected to the linear actuators 90, 92 for delivering a supply flow of pneumatic air from a supply of pressurized air to the linear actuators 90, 92; see FIG. 6. Two or more actuator buttons 100a, b, c can be provided which are operatively connected to the valve assembly 99 for actuating the delivery of pneumatic air to or from the linear actuators 90, 92, respectively.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
61 web body
62 first mounting flange
63 second mounting flange
65 lifting assembly
66 spar cap
67 spar cap
68 crane device
69 lifting rail
70 lifting clamp
72 lifting clamp
74 clamp body
75 fixed support/base plate
75a slot of base plate
76 fixed support/base plate
76a slot/cut-out of base plate 76b lower part of cut-out
76c upper part of cut-out
77 receiving space
80 first jaw
80a free end of first jaw
80b lining on first jaw
82 second jaw
82a free end of second jaw
82b lining on second jaw
83 first arm
83a first end of first arm
83b second end of first arm
84 second arm
84a first end of second arm
84b second end of second arm
85 first sector gear
86 second sector gear
87 first guide member
87a slot of first guide member
88 second guide member
88a slot of second guide member
90 first linear actuator
92 second linear actuator
93 first pin
94 second pin
95 first attachment eye
96 second attachment eye
97 first chain
97a hook on first chain
98 second chain
99 valve assembly
100 actuator buttons
110 reel member
112 air supply hose
112a free end of air supply hose
114 air compressor
116 air supply line
118 mould
120 handles
122 connecting element
124 shafts
L length
r distance from hub
R rotor radius
W width of receiving space
h height of receiving space

The invention claimed is:

1. A lifting clamp (70) for releasably engaging a shear web for a wind turbine blade, the lifting clamp (70) comprising:
  a clamp body (74) comprising a fixed support (75, 76), the clamp body defining a receiving space (77) for receiving at least part of the shear web for the wind turbine blade;
  a pair of jaws (80, 82) arranged on opposite sides of the receiving space (77), the pair of jaws (80, 82) being pivotably mounted to the fixed support;
  a pair of linear actuators (90, 92), each of the linear actuators being connected to a respective one of the pair of jaws (80, 82) for opening and closing the pair of jaws (80, 82) between a retracted position and engagement position, wherein the pair of linear actuators (90, 92) are arranged within the clamp body (74);
  a pair of arms (83, 84), each of the arms having a first end (83a, 84a) and an opposing second end (83b, 84b); and
  a pair of sector gears (85, 86), wherein each of the arms (83, 84) is connected to one of the jaws (80, 82) at the first end (83a, 84a) thereof and to a respective one of the sector gears (85, 86) at the second end (83b, 84b) thereof, and wherein the pair of sector gears (85, 86) is engaged together to provide a synchronized movement of the pair of jaws (80, 82),
  wherein the fixed support comprises a pair of spaced side plates (75, 76) defining a cavity therebetween, wherein each of the spaced side plates (75, 76) has a slot (75a, 76a) defining the receiving space (77), wherein the pair of jaws (80, 82) extend into the receiving space (77) in the engagement position and are clear from the receiving space (77) and accommodated within the cavity in the retracted position, and
  wherein the pair of linear actuators (90, 92) are mounted between the pair of spaced side plates (75, 76).

2. The lifting clamp (70) according to claim 1, wherein each of the linear actuators is a pneumatic cylinder.

3. The lifting clamp (70) according to claim 1, wherein the lifting clamp (70) comprises at least two spaced attachment eyes (95, 96) each adapted for receiving a hook or a chain (97, 98) therein.

4. The lifting clamp (70) according to claim 1, wherein the receiving space (77) has a width (w) of at least 200 mm.

5. A lifting assembly (65) for lifting a shear web for a wind turbine blade, the lifting assembly (65) comprising:
  at least one crane device (68);
  a lifting rail (69) suspended from the at least one crane device (68); and
  a plurality of lifting clamps, wherein each of the lifting clamps is connected to the lifting rail (69), and wherein each of the lifting clamps comprise:
    a clamp body (74) comprising a fixed support (75, 76), the clamp body defining a receiving space (77) for receiving at least part of the shear web for the wind turbine blade;
    a pair of jaws (80, 82) arranged on opposite sides of the receiving space (77), the pair of jaws (80, 82) being pivotably mounted to the fixed support;
    a pair of linear actuators (90, 92), each of the linear actuators being connected to a respective one of the pair of jaws (80, 82) for opening and closing the pair of jaws (80, 82) between a retracted position and engagement position, wherein the pair of linear actuators (90, 92) are arranged within the clamp body (74);
    a pair of arms (83, 84), each of the arms having a first end (83a, 84a) and an opposing second end (83b, 84b); and
    a pair of sector gears (85, 86), wherein each of the arms (83, 84) is connected to one of the jaws (80, 82) at the first end (83a, 84a) thereof and to a respective one of the sector gears (85, 86) at the second end (83b, 84b) thereof, and wherein the pair of sector gears (85, 86) is engaged together to provide a synchronized movement of the pair of jaws (80, 82),
    wherein the fixed support comprises a pair of spaced side plates (75, 76) defining a cavity therebetween, wherein each of the spaced side plates (75, 76) has a slot (75a, 76a) defining the receiving space (77), wherein the pair of jaws (80, 82) extend into the receiving space (77) in the engagement position and are clear from the receiving space (77) and accommodated within the cavity in the retracted position, and
    wherein the pair of linear actuators (90, 92) are mounted between the pair of spaced side plates (75, 76).

6. The lifting assembly (65) according to claim 5, wherein each of the lifting clamps (70, 72) is suspended from the lifting rail (69) by a pair of chains or cables (97, 98) fixed to the lifting clamp at respective spaced apart attachment points (95, 96), wherein the pair of chains or cables is provided between the lifting rail (69) and the respective one of the lifting clamps in a substantially upside down V-shaped arrangement.

7. The lifting assembly (65) according to claim 5, wherein an air supply hose (112) is arranged along the lifting rail (69) for supply air to the respective pneumatic cylinders of the lifting clamps (70, 72), wherein the lifting assembly (65) comprises a reel member (110) rotatably mounted on the lifting rail (69) for receiving at least part of the air supply hose (112), wherein the lifting assembly (65) further comprises an air compressor (114) connected to an air supply line (116), wherein the free end (112$a$) of the air supply hose is releasably connected to the air compressor (114), wherein the air compressor (114) is spaced apart from the lifting rail (69) and the lifting clamps (70, 72).

\*    \*    \*    \*    \*